US012565982B2

(12) United States Patent
Henrici et al.

(10) Patent No.: US 12,565,982 B2
(45) Date of Patent: Mar. 3, 2026

(54) LED CONNECTION ELEMENT AND LIGHT GUIDE ELEMENT

(71) Applicant: BJB GmbH & Co. KG, Arnsberg (DE)

(72) Inventors: Philipp Henrici, Arnsberg (DE); Olaf Baumeister, Sundern (DE); Tobias Bäcker, Welver-Berwicke (DE)

(73) Assignee: BJB GmbH & Co. KG, Arnsberg (DE)

( * ) Notice: Subject to any disclaimer, the term of this patent is extended or adjusted under 35 U.S.C. 154(b) by 0 days.

(21) Appl. No.: 19/055,029

(22) Filed: Feb. 17, 2025

(65) Prior Publication Data

US 2025/0264211 A1 Aug. 21, 2025

(30) Foreign Application Priority Data

Feb. 19, 2024 (DE) ..................... 10 2024 104 553.1

(51) Int. Cl.

| | |
|---|---|
| ***F21V 19/00*** | (2006.01) |
| *F21V 17/12* | (2006.01) |
| *F21Y 105/18* | (2016.01) |
| *F21Y 115/10* | (2016.01) |

(52) U.S. Cl.

CPC ........ *F21V 19/0035* (2013.01); *F21V 19/004* (2013.01); *F21V 19/0045* (2013.01); *F21V 19/0055* (2013.01); *F21V 17/12* (2013.01); *F21Y 2105/18* (2016.08); *F21Y 2115/10* (2016.08)

(58) Field of Classification Search

CPC ............... F21V 19/0035; F21V 19/004; F21V 19/0045; F21V 19/0055; F21V 17/12

See application file for complete search history.

(56) References Cited

U.S. PATENT DOCUMENTS

| | | | | |
|---|---|---|---|---|
| 8,684,569 B2 * | 4/2014 | Pickard | F21V 13/14 362/147 |
| 9,249,955 B2 * | 2/2016 | Schroll | F21V 29/70 |
| 10,309,623 B2 | 6/2019 | Nanni | |
| 2012/0051068 A1 | 3/2012 | Pelton et al. | |
| 2012/0236563 A1 | 9/2012 | Breidenassel et al. | |

(Continued)

FOREIGN PATENT DOCUMENTS

| | | |
|---|---|---|
| DE | 29502467 U1 | 8/1995 |
| DE | 102009047493 A1 | 6/2011 |

(Continued)

*Primary Examiner* — Christopher E Dunay
(74) *Attorney, Agent, or Firm* — Smartpat PLC

(57) ABSTRACT

A connection element electrically connects an LED light module. The LED light module has a printed circuit board with contact springs for the electrical supply of the LED. The connection element includes an annular frame to cover the printed circuit board and to hold it mechanically on an arrangement surface of a counter bearing. A contact arrangement is mounted in the frame and serves to supply the LEDs with electricity. The frame is divided into an outer ring and an inner ring. The outer ring is provided to surround the printed circuit board and to hold it in the parallel direction to the arrangement surface of the counter bearing. The inner ring at least regionally surrounds the printed circuit board and is provided to hold the printed circuit board in the vertical direction to the surface of the counter bearing. The inner ring is implemented in a light directing component.

14 Claims, 14 Drawing Sheets

(56) References Cited

U.S. PATENT DOCUMENTS

| | | | | |
|---|---|---|---|---|
| 2012/0287644 | A1* | 11/2012 | Wronski | F21V 13/00 362/296.01 |
| 2013/0121759 | A1 | 5/2013 | Breidenassel et al. | |
| 2015/0055356 | A1* | 2/2015 | Derks | H01R 13/24 362/418 |
| 2018/0003365 | A1* | 1/2018 | Nanni | F21V 17/14 |
| 2018/0216801 | A1* | 8/2018 | Thiele | F21V 19/004 |
| 2019/0234602 | A1* | 8/2019 | Eckert | F21V 15/01 |

FOREIGN PATENT DOCUMENTS

| | | | |
|---|---|---|---|
| DE | 102010031312 | A1 | 1/2012 |
| DE | 102017101809 | A1 | 8/2018 |
| DE | 202023105716 | U1 | 10/2023 |
| EP | 2083489 | | 7/2009 |
| EP | 2963341 | A1 | 1/2016 |

* cited by examiner 672
671
600
605/610
634/ 642
670
632/632A
652
654
643
653
650
647
646
644
645
E
R
648
650
649
647
644
646
645
K
614
615
K
x
618
617
619
618
617
619
620
625
626
626
S
636/640
623
624
635/640
M
621
T

LED CONNECTION ELEMENT AND LIGHT GUIDE ELEMENT

CROSS-REFERENCE TO RELATED APPLICATION

This application claims the benefit of German Patent Application DE 10 2024 104 553.1, filed on Feb. 19, 2024, the content of which is incorporated in its entirety.

TECHNICAL FIELD

The application relates to a connection element for the electrical connection of an LED light module.

The application additionally relates to a light directing component for a luminaire, having a component basic body which spans a component space, wherein the component basic body has a base part which forms an opening for receiving a light module.

BACKGROUND

Connection elements for electrically connecting an LED light module are well known in the prior art, such as from EP 2 083 489 A1 of the applicant, for example. This is a ring element that surrounds a printed circuit board and is able to hold the printed circuit board between itself and a counter bearing, in particular a heat sink. For this purpose, the ring element is fastened to the counter bearing using, for example, screw bolts. It sits on the printed circuit board with a part of its surface facing towards the printed circuit board. The ring element carries contacts in contact chambers. These contacts have a clamping section into which the stripped end of a connecting conductor is to be inserted. The connecting conductor is thus held in the clamping section and electrically contacted. Each contact then has spring legs that serve as pressure contacts and rest on contact fields on the printed circuit board. The connection element from the aforementioned patent specification thus serves both for electrically contacting and for mechanically holding the printed circuit board on a counter bearing. The printed circuit board itself carries an LED. It thus represents a light module which is used in luminaires instead of known filament lamps or similar conventional light modules.

SUMMARY

Connection elements have proved extremely successful in practice and are used in particular for spot lighting where LED light modules are used.

LED technology has developed considerably in the meantime. Printed circuit boards with attached LEDs are now available in a large number of luminous intensities and outputs, which is why the shape and, above all, the size of the printed circuit boards and the LEDs arranged on them vary greatly from manufacturer to manufacturer and in different performance classes.

There are therefore a plurality of connection elements on the market, each of which can be used with many specific LED printed circuit boards from a particular manufacturer and a particular performance class. This is advantageous in principle, since suitable connection elements are available for every application. However, this offer does not meet the requirements of the lighting industry. There, partial components of luminaires are stored pre-assembled in order to then be finally assembled when a certain type of light is purchased.

For example, a certain type of luminaire is offered in different wattages, i.e. with different luminosity or colour temperature of the light module. On the one hand, the standardised housing components are provided for this type of luminaire. On the other hand, the actual lighting equipment-usually consisting of an LED light module, mounted on a suitably dimensioned heat sink-is kept in stock in different variants. In this way, a modular system can be used for incoming orders of luminaires, which enables simple final assembly of the required luminaire.

A disadvantage here, however, is stocking a large number of lighting devices. The completely pre-assembled unit consisting of LED light module, connection element and suitable heat sink represents a not inconsiderable value of the actual luminaire. Depending on the number of variants of a type of luminaire, a large amount of stock is required.

As a result, according to DE 20 2023 105 716 U1 of the applicant, a generic connection element has been developed, which compensates for existing disadvantages by the two-part construction of the frame of the connection element in the outer ring and inner ring.

However, the connection elements are also increasingly subject to the requirement of quick interchangeability and at the same time sustainability, as well as the premise of the safety aspect. Simplified handling and an increasing reduction in the number of components are also becoming more and more important in the lighting industry, although the light quality of the light sources used must not be impaired. Optimisation of the light quality emitted is also desired and even required.

At the same time, the demand for light directing components is also increasing. These can be optics, reflectors, lenses or also collimators, for example. On the one hand, these should ensure the best possible light emission and thus light efficiency. On the other hand, the idea of interchangeability and sustainability is also becoming increasingly important for light directing components under the premise of safety and easy handling of the light directing components.

An object of the application is, on the one hand, to create a connection element which, in addition to optimised handling, is still subject to the required safety criteria and ensures a reduction in the number of components under the premise of high-quality light quality.

The object is solved by a connection element for the electrical connection of an LED light module. The LED light module has a printed circuit board which is provided with contact springs for the electrical supply of the LED. The connection element has an annular frame which is provided to surround a printed circuit board and to hold it mechanically on an arrangement surface of a counter-bearing. The connection element includes a contact arrangement which is mounted in the frame and serves for the electrical supply of the LED. The frame is divided into an outer ring and an inner ring. The outer ring is provided to surround the printed circuit board and to be held in a parallel direction in relation to the arrangement surface of the counter-bearing. The inner ring at least regionally surrounds the printed circuit board and is provided to hold the printed circuit board in a vertical direction in relation to the surface of the counter bearing.

The inner ring and the light directing component are no longer two separate components, but that the inner ring is part of the light directing component. On the one hand, this ensures component reduction and, on the other hand, the manufacturer can now pre-assemble the connection element and the light directing component. The arrangement of the inner ring with the light directing component on the outer ring can be carried out at the assembly end position. The reduction in components is additionally associated with a reduction in time, since fewer components now need to be arranged next to one another.

For this purpose, it is provided that the inner ring forms the base part of the light directing component. The inner ring implemented in the light directing component is arranged downstream of the outer ring in the direction of light emission. This means that the inner ring is mounted on the outer ring in such a way that the inner ring can be inserted into the outer ring vertically against the direction of light emission for fastening to the outer ring. For this purpose, the inner ring and thus the light directing component is arranged in the outer ring.

It is envisaged that the inner ring forms at least one fastening element which interacts with a fastening element of the outer ring for fastening. This interaction serves to arrange the components of the connection element fixedly, albeit potentially also detachably, on one another and thus to arrange the connection element functionally and securely in the final assembly position.

In addition, by fastening the light directing component in the immediate vicinity of the printed circuit board with LED, it is ensured that the light emitted by the LED or the light beams radiate directly into the light directing component and that this guides the light beams away. The light emitted from the light directing component thus has a high degree of light quality and light intensity, since there is virtually no loss of light beams. Overall, the light efficiency of the light module is thus significantly improved.

It is furthermore provided that the inner ring forms a stop means as a fastening element and the outer ring forms a stop means recess as a fastening element.

The advantage here is that the stop means can be inserted into the stop means recess in order to arrange the inner ring in the outer ring and the inner ring and the outer ring can be fastened together by twisting the inner ring in the manner of a bayonet lock. Bayonet connections are particularly stable connections that can withstand mechanical loads, in particular vibrations.

It is also envisaged that the fastening element of the inner ring and the fastening element of the outer ring are screw fasteners. The advantage of this type of fastening element is that it can be loosened. The inner ring, which forms the screwing means, is arranged on the outer ring and then moved against the direction of light emission and thus screwed against the outer ring. The outer ring and inner ring with light directing component are fastened to each other by the application of force. The inner ring with screwing means can be detached by the inner ring with light directing component being able to be unscrewed again in the direction of light emission. It is advantageous that both the fastening and the loosening of the inner ring with screwing means is also possible without tools. In addition, the loosening of the screwing means is reversible. This means that further fastening processes are possible even after the initial arrangement and subsequent loosening of the inner ring with screwing means.

It is provided that the inner ring has an outer contour which is shaped as an outer thread, and the outer ring has an inner contour which is shaped as an inner thread. The outer thread of the inner ring interacts with the inner thread of the outer ring for fastening in the outer ring. As a result of the interaction of the inner thread of the inner ring with the outer thread of the outer ring, the inner ring with the light directing component and the outer ring are fastened together by means of a self-locking frictional connection, i.e. a frictional connection. This fastening method is very stable, since loosening is only possible by moving the two threads apart. Thus, this fastening is also securely protected against strong mechanical loads, in particular vibrations.

It is also possible that the inner ring has an inner contour which is shaped as an inner thread, and the outer ring has an outer contour which is shaped as an outer thread, wherein the outer thread of the inner ring interacts with the inner thread of the outer ring for fastening in the outer ring.

Alternatively, it is envisaged that the fastening element of the inner ring and the fastening element of the outer ring are latching means that interact with each other.

The fastening element of the inner ring forms a spring-receiving chamber for a catch spring, which extends in relation to the outer ring resting on the arrangement surface into a region below the arranging surface, wherein the outer ring as a fastening element forms a dome for receiving the catch springs.

In order to be able to compensate for high tolerances with regard to the thickness of the printed circuit board and optionally thermal conductors arranged between the printed circuit board and the counter bearing, it is necessary for the inner ring to be able to perform a comparatively large movement stroke vertically to the arrangement surface of the counter bearing or in the light emission direction of the LED. At the same time, the catch spring must be able to exert sufficient pressure forces in the direction of the arrangement surface in any position of the inner ring caused by the tolerances.

This requires a catch spring that can cover a comparatively large spring path and is capable of withstanding sufficient pressure forces. Space must be created in the connection element for a large spring path. Certain dimensions of the catch spring element are required for large spring forces. These requirements for a catch spring contradict the technical need to create connection elements that are as flat as possible in order to avoid shading of the emerging light by the connection element.

Shifting the required construction space for the catch spring to be used to a region below the arrangement plane of the counter bearing or at least extending into this region is beneficial. In this way, the thickness of the connection element measured in the direction of light emission or vertically to the arrangement plane of the counter bearing can be reduced to what is absolutely necessary. Shadowing of the emerging light by the connection element is reliably avoided or greatly reduced. Nevertheless, there is sufficient construction space for a catch spring element, which requires a sufficiently large spring receiving chamber due to the spring forces to be applied and, in particular, the required spring path.

It is envisaged that the spring receiving chamber is formed by a dome that emerges from the underside of the outer ring and is directed in particular against the direction of light emission. The spring element can be arranged in this dome and is thus provided with sufficient movement space for the required spring path, in particular in the case of a spring element shown in the exemplary embodiment with a pivot axis aligned in parallel to the arrangement surface.

On the other hand, the object of the disclosure is to create a light directing component that ensures the most light-efficient emission of the light module possible, also guarantees safe and easy handling and is conducive to interchangeability and sustainability.

BRIEF DESCRIPTION OF THE DRAWINGS

The invention is now explained in more detail with reference to six exemplary embodiments, from which further advantages and features emerge.

DETAILED DESCRIPTION

Figure 9:
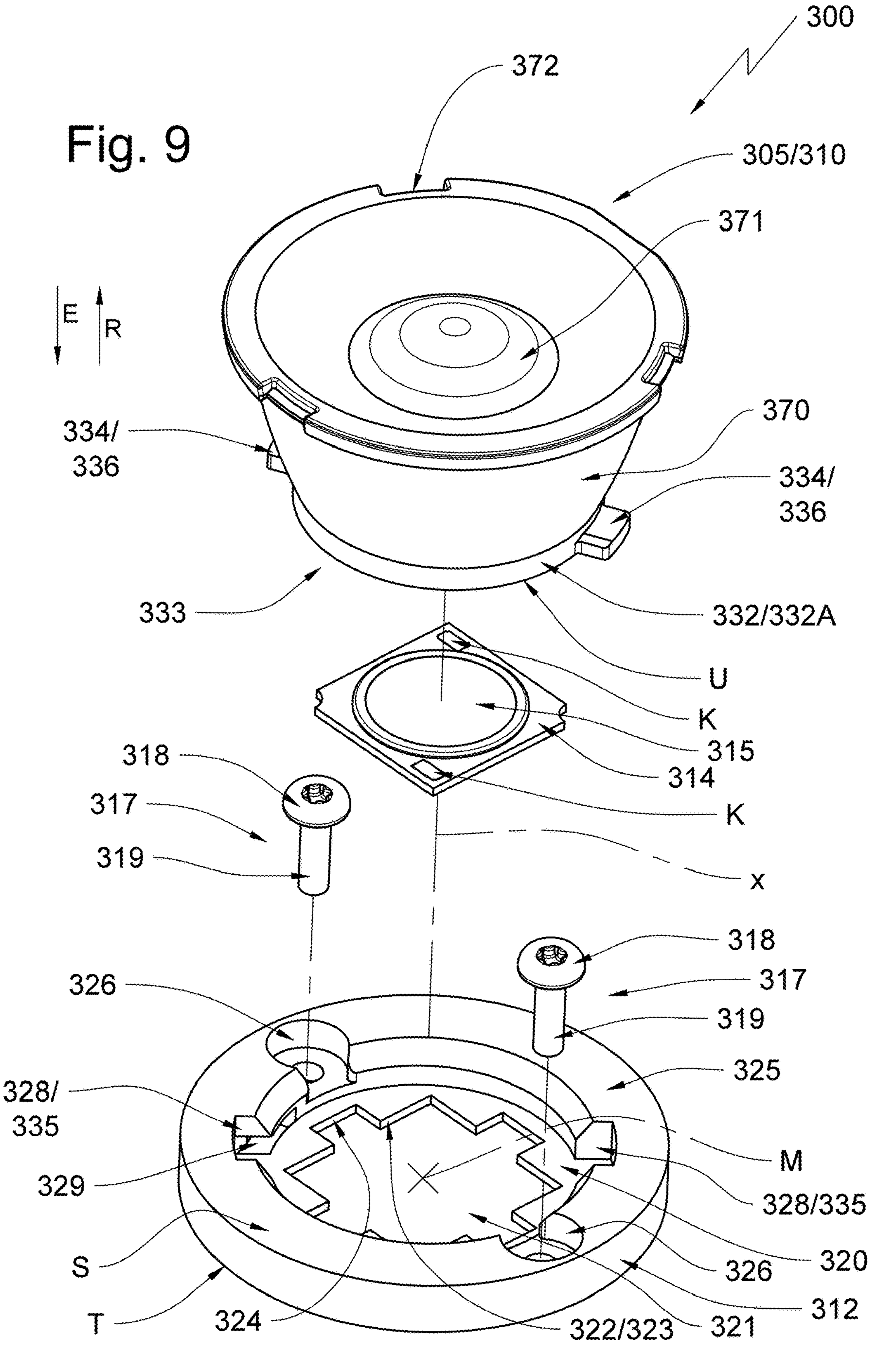
FIG. 9 shows a third embodiment of the third connection element with light directing component in an exploded depiction.
Figure 10:
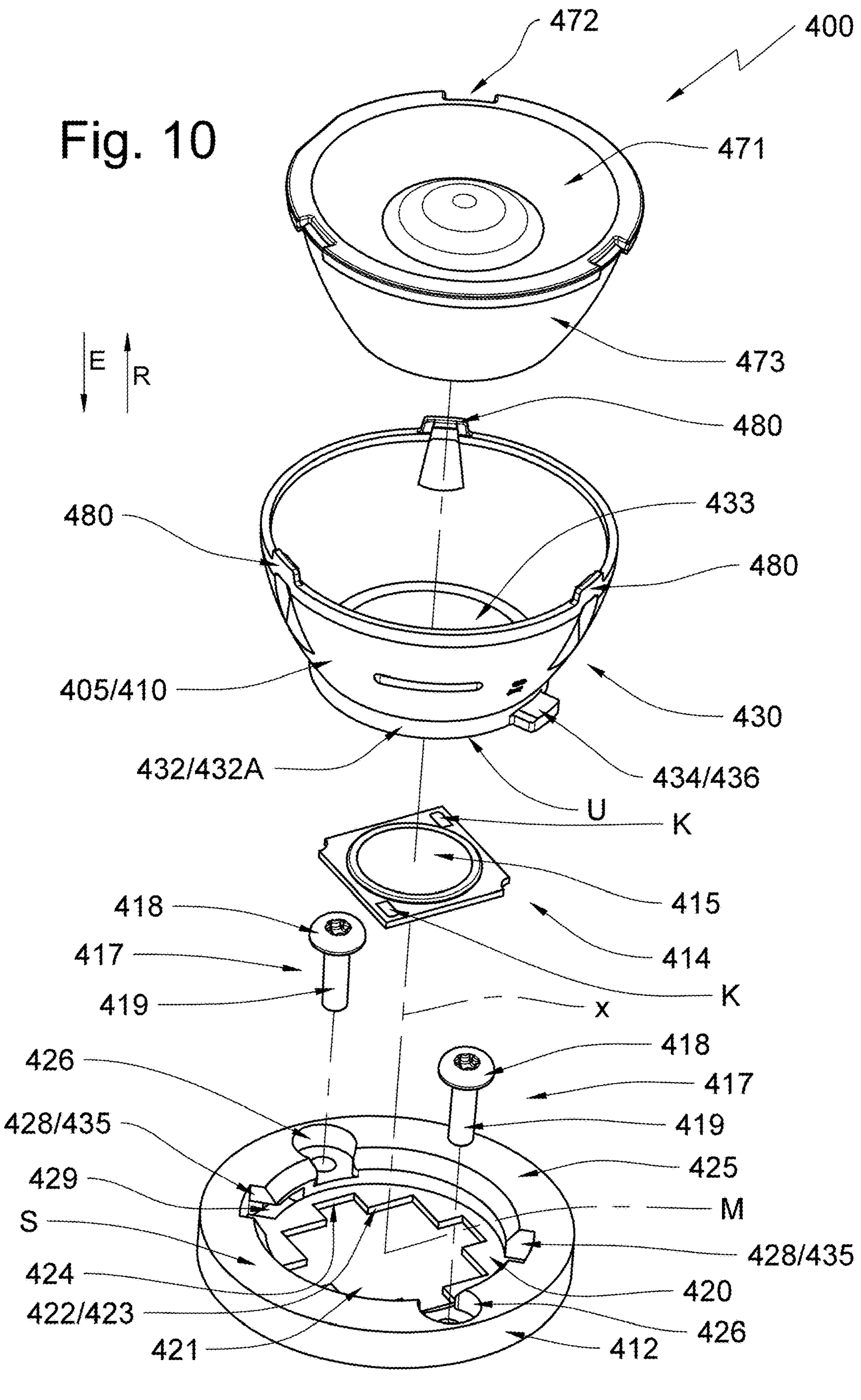
FIG. 10 shows a fourth embodiment of the fourth connection element with light directing component.
Figure 11:
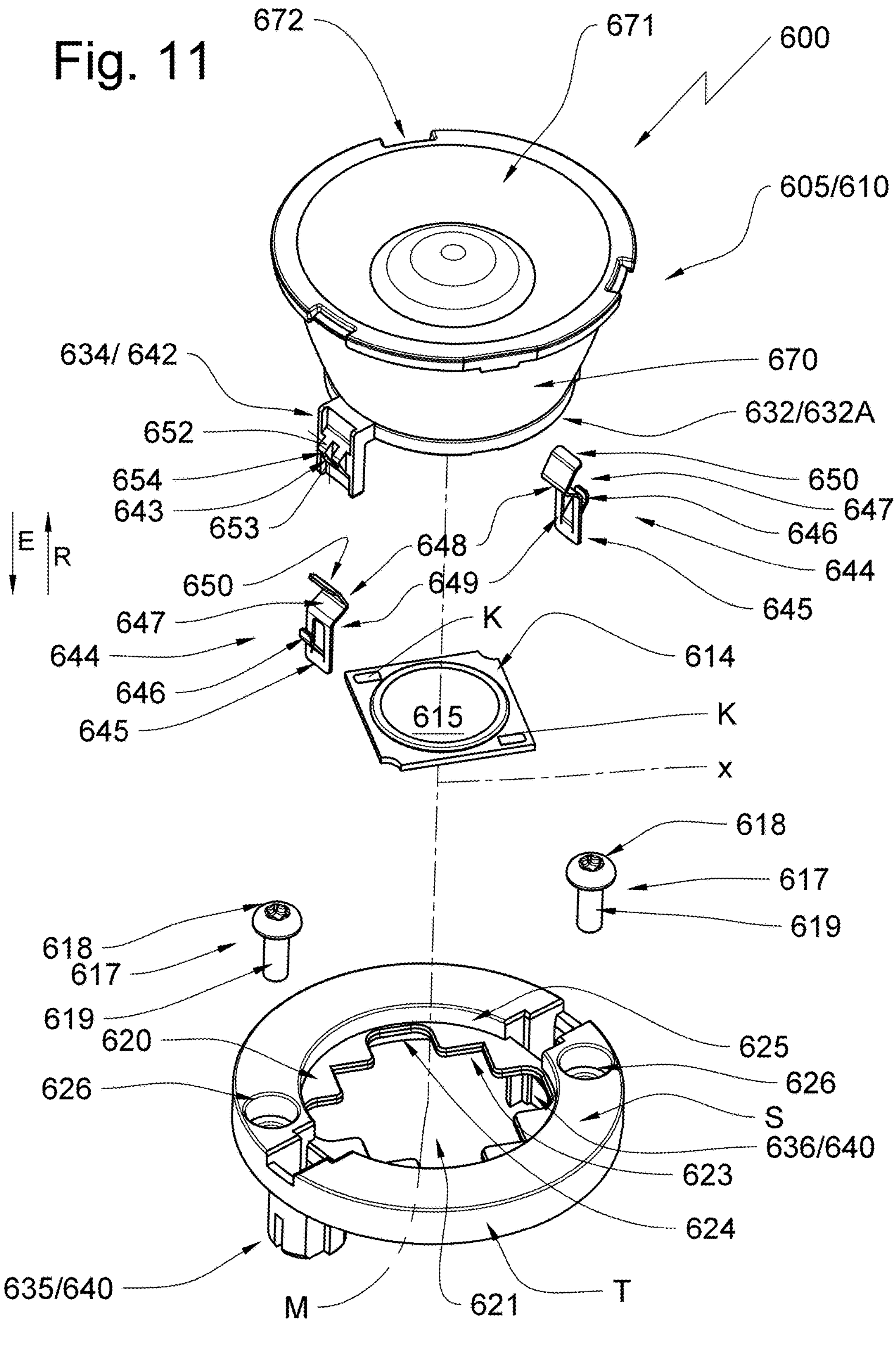
FIG. 11 shows a fifth embodiment of the fifth connection element with light directing component.
Figure 12:
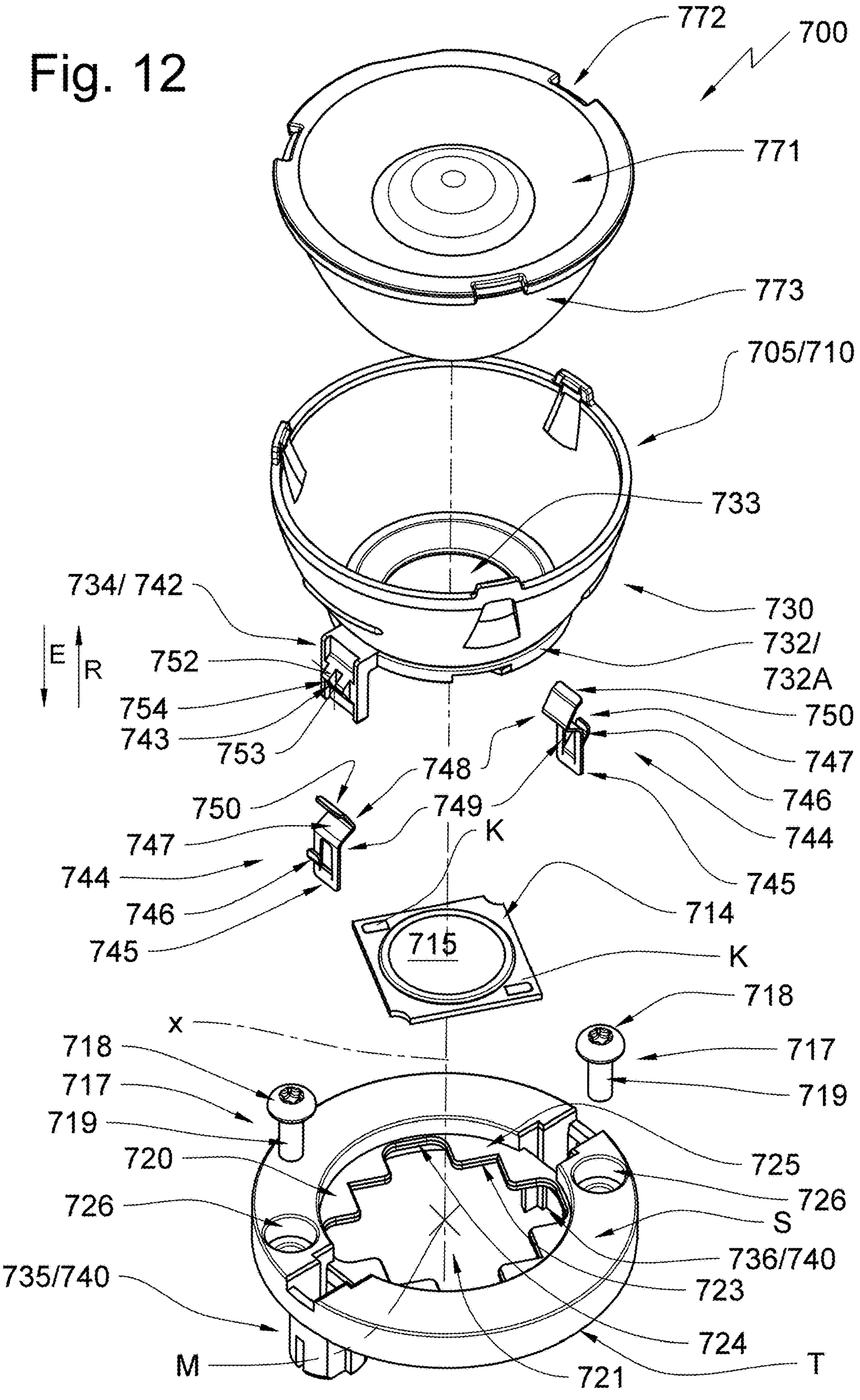
FIG. 12 shows a sixth embodiment of the sixth connection element.

In FIGS. 1 to 4B, a first embodiment is overall provided with reference number 100. A second embodiment is shown in FIGS. 5 to 8B and identified overall with reference number 200. FIG. 9 shows the third embodiment overall with the reference number 300. In FIG. 10, the fourth embodiment is shown with reference number 400. A fifth embodiment 600 is depicted in FIG. 11. Finally, FIG. 12 shows a sixth embodiment 700.

The embodiments 100/200/300/400/600/700 have a number of identical components. Insofar as identical or identically functioning components are used, these are given the same name and differ only in that they use either the number range 100, the number range 200, the number range 300, the number range 400, the number range 600 or the number range 700.

Thus, what has been said about the first embodiment always applies to the second to sixth embodiments, insofar as identical or identically functioning components are affected.

In all figures, the installation direction E is defined as perpendicular in the direction of the arrangement plane 510 on the surface 511 of a heat sink 500 and the light emission direction R is defined as perpendicular away from the arrangement plane 510. The arrangement plane 510 as the surface 511 of a heat sink 500, on which all embodiments can be mounted, is shown.

It also applies to all figures that a system axis X runs through the centre point M of the arrangement of the outer and inner ring in the light emission direction R.

FIGS. 1 to 4 show the first embodiment 100 of the first connection element 110 with a light directing component 105, which is formed as a reflector 111.

Figure 1:
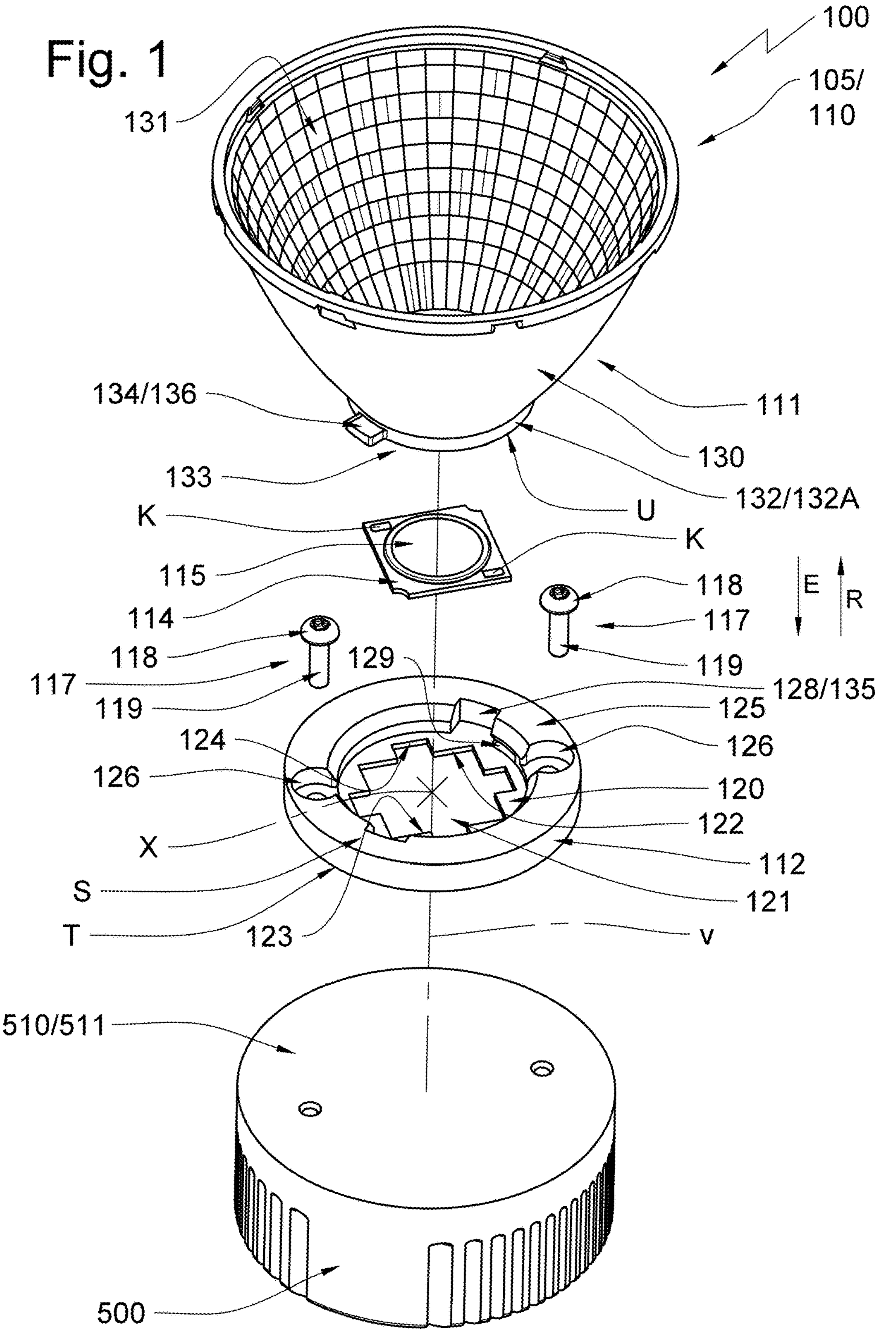
FIG. 1 shows a first embodiment of the first connection element with light directing component in an exploded depiction.

In FIG. 1, the connection element 110 and the reflector 111 is depicted in an exploded view. The connection element 110 has an outer ring 112. On the one hand, the outer ring 112 interacts with a printed circuit board 114, which carries LEDs 115 as light modules and contact springs K for contacting. On the other hand, the connection element 110 co-operates with a counter bearing, for example a heat sink (not depicted). Instead of the heat sink, however, the counter bearing can also be a light component of any type.

The connection element 110 is fixed to the heat sink by means of two screws 117, which form a screw head 118 and a screw body 119. Here, the connection element 110 holds the LED 115 of the printed circuit board 114 between itself and the heat sink.

The outer ring 112 firstly has a bottom base plate 120. The bottom base plate 120 in turn forms an aperture 121. This aperture 121 defines the inner silhouette 122 of the outer ring 112, which is subdivided into a rectangular, in particular square, insert contour 123 and an engagement contour 124. The engagement contours 124 merge into the insert contour 123.

An annular collar 125 sits on the bottom base plate 120, said annular collar surrounding the aperture 121 and having receiving holes 126. The receiving holes 126 serve to receive the screw 117.

The annular collar 125 forms inner wall sections 125, which are interrupted by fastening elements 136 formed as stop means receivers 128, which run on a common radius around a centre point M. The stop means receivers 128 form blind hole sections 129 mounted in parallel to the bottom base plate 120.

The contact arrangement provided for the power supply of the printed circuit board 114 is not depicted in the exemplary embodiments.

The reflector 111 has a reflector base body 130, which in turn spans a reflector chamber 131. The reflector base body 130 has a base part 132 with an opening 133 for receiving the LEDs 115. The base part 132 is simultaneously the first inner ring 132A of the connection element 110. On the one hand, the inner ring 132A has an underside U, which points in the direction of the outer ring 112, and also has two diametrically opposed fastening elements 134 on the outside, which are formed as stop means 135.

Figure 2:
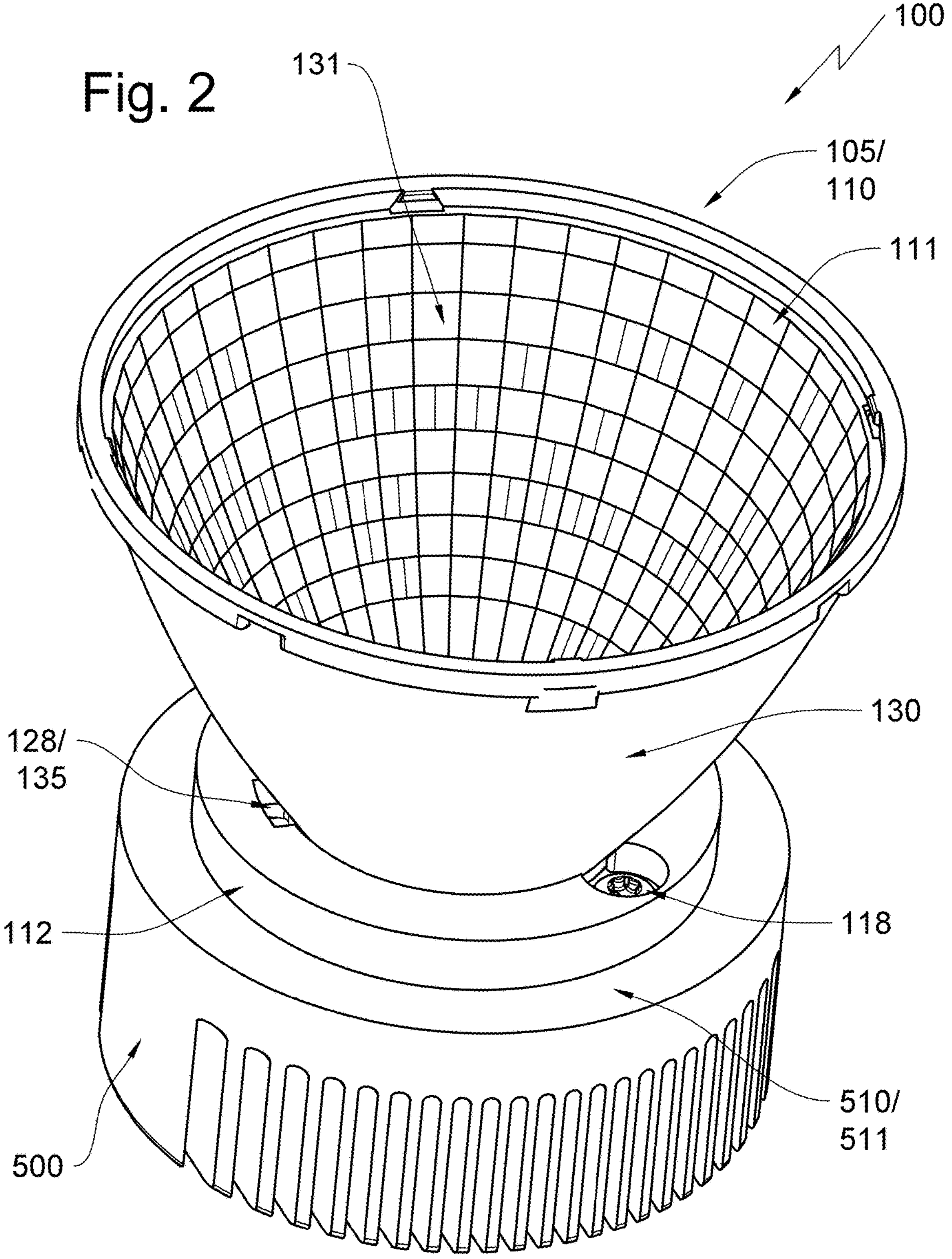
FIG. 2 is a perspective view of the first connection with light directing component according to FIG. 1.
Figure 3:
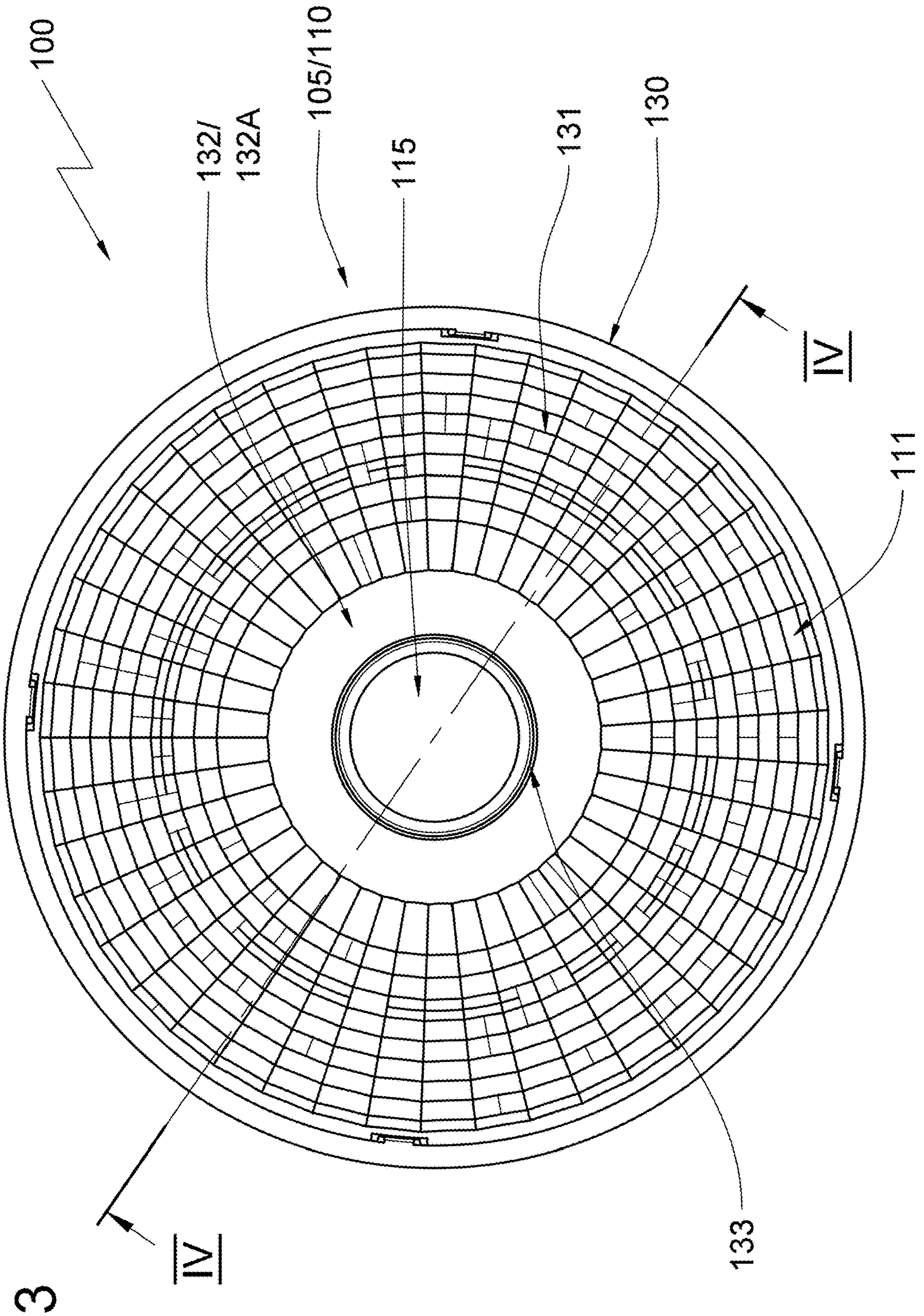
FIG. 3 is a top view of the first connection element with light directing component according to FIG. 2.

FIGS. 2 to 4 show the assembled state of the connection element 110 with reflector 111. It can be seen from FIG. 3 that the opening 133 is arranged above the printed circuit board 114 with LED 115 inserted in the outer ring 112, and the reflector 111 does not cover the printed circuit board 114.

FIG. 3 shows the top view of the connection element 110 assembled with the reflector 111. It can be clearly seen that the opening 133 of the reflector 111 surrounds the LEDs 115 and that the inner ring 132A abuts directly on the printed circuit board 114 (not depicted), and the light rays of the LEDs 115 shine directly into the reflector chamber 131 and are not deflected by other components.

Figure 4A:
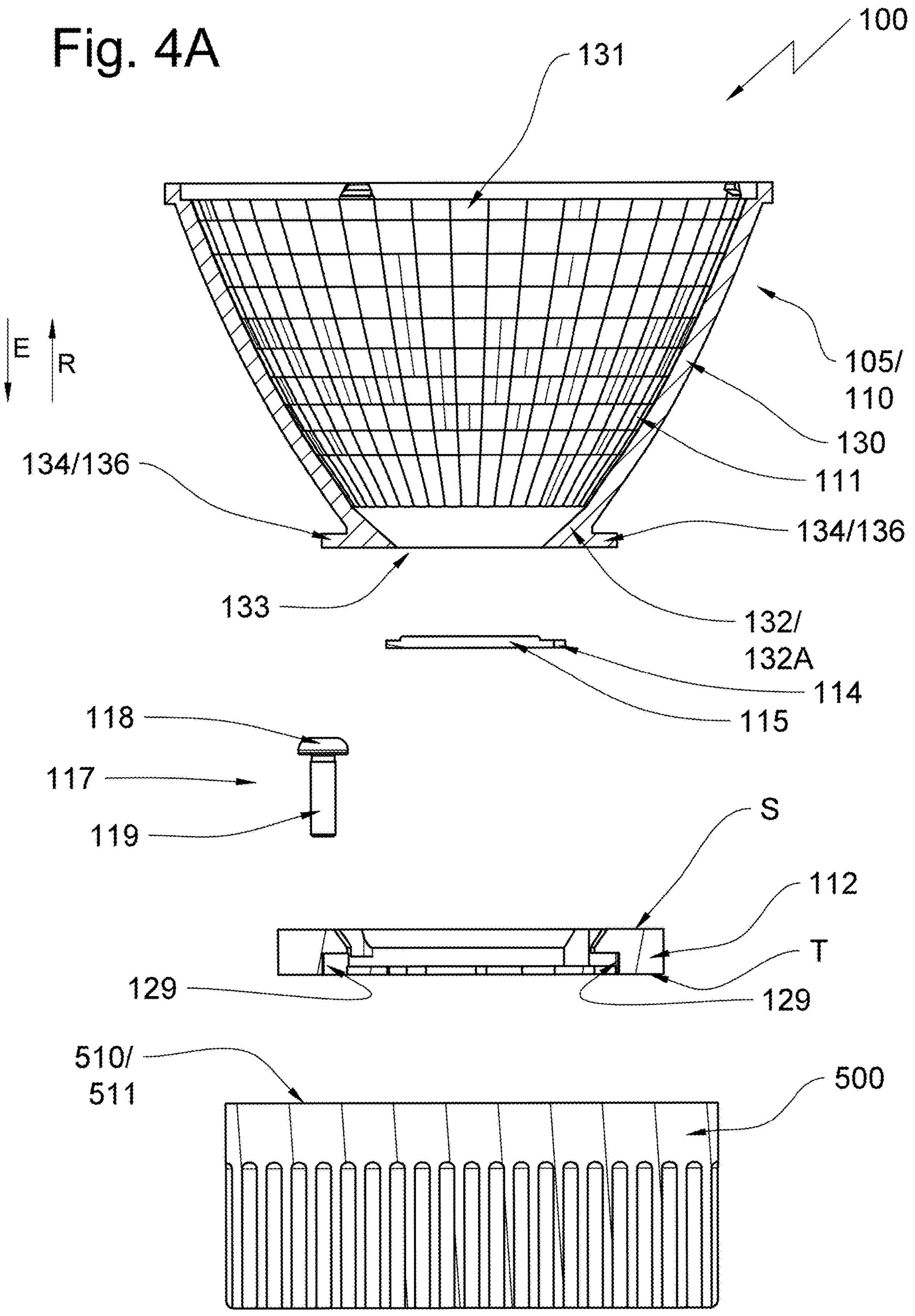
FIG. 4A is an exploded depiction of the sectional depiction of the first connection element with reflector according to intersecting lines IIIA-IIIA from FIG. 3.

FIG. 4A shows the outer ring 112 and the reflector 111 with inner ring 132A. The arrangement of the blind hole sections 129 in the inner wall sections 125 of the outer ring 112 can be clearly seen. These serve to receive the stop means 135.

Figure 4B:
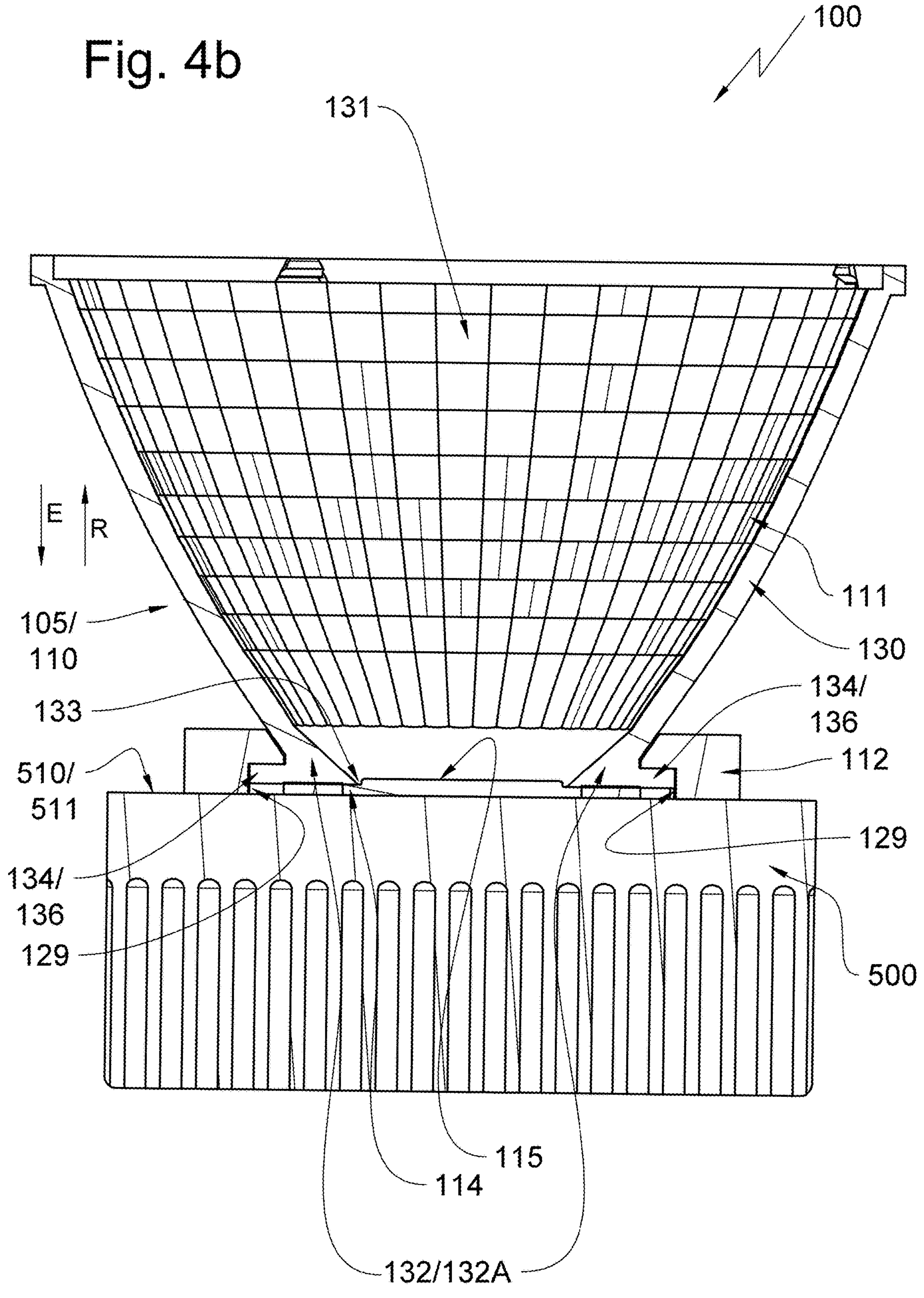
FIG. 4B is a sectional depiction of the first connection element with light directing component according to intersecting lines IIIA-IIIA from FIG. 3.
Figure 5:
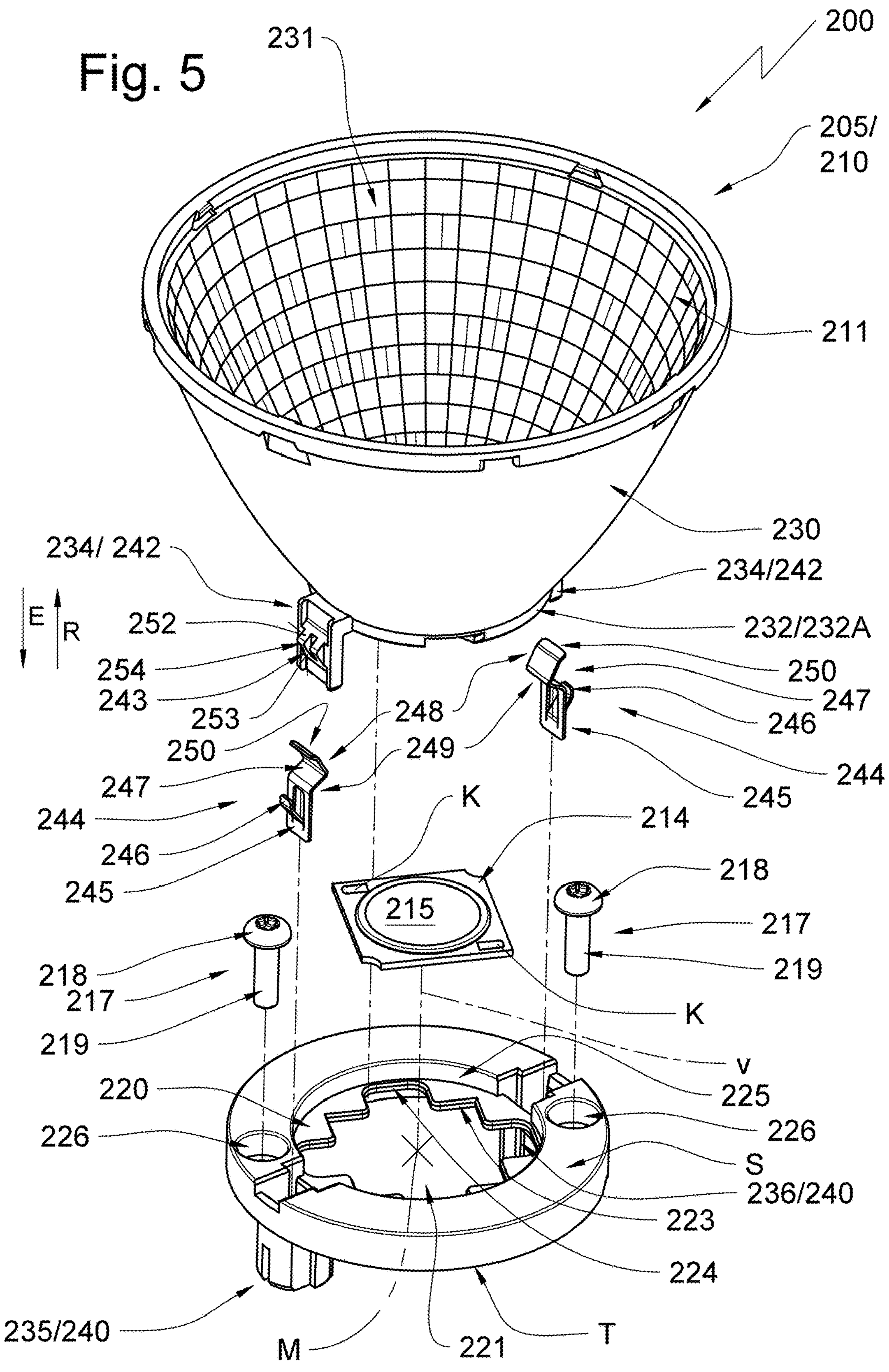
FIG. 5 shows a second embodiment of the second connection element with light directing component in an exploded depiction.
Figure 6:
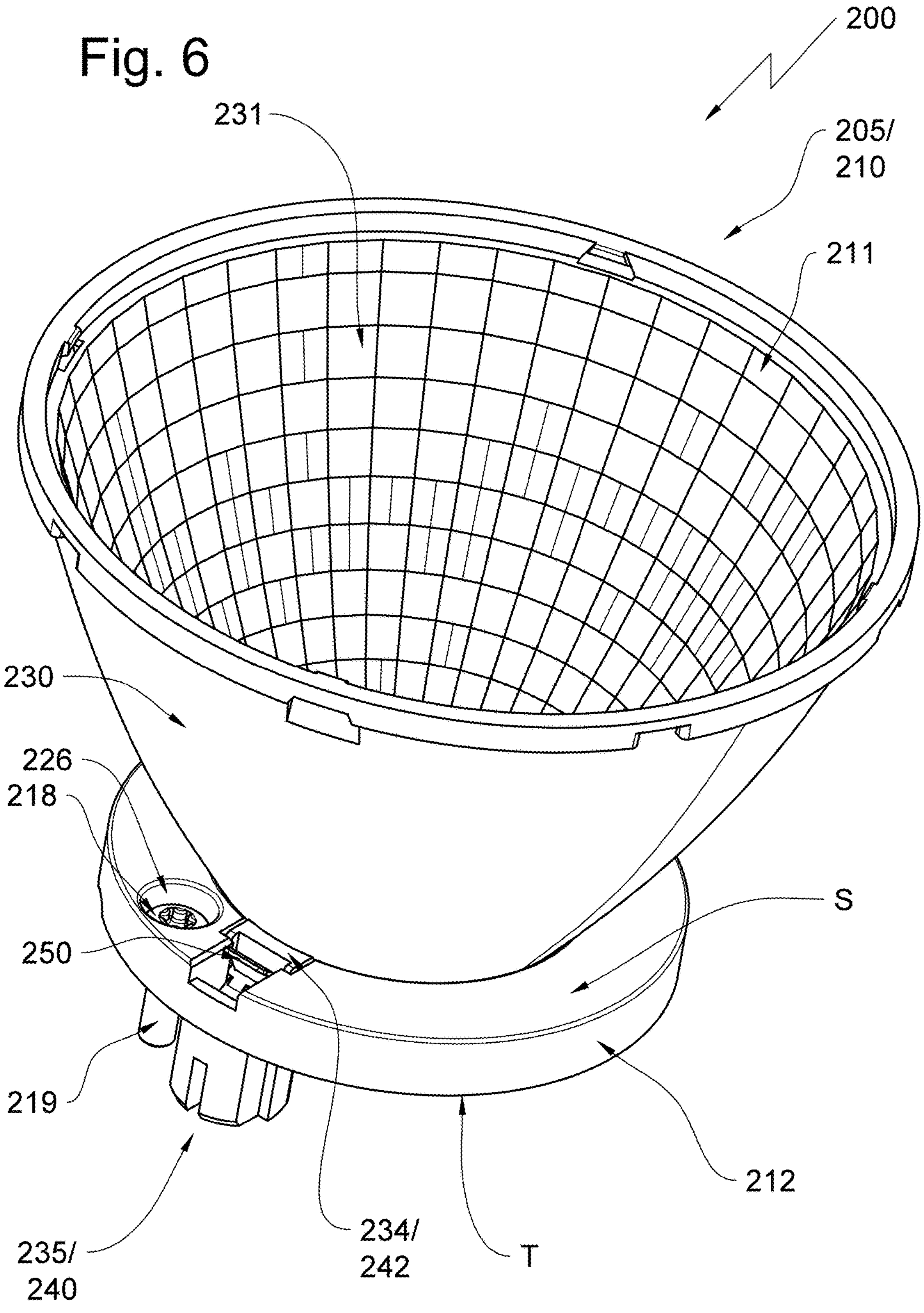
FIG. 6 is a perspective view of the second connection element with light directing component in the assembled state according to FIG. 5.
Figure 7:
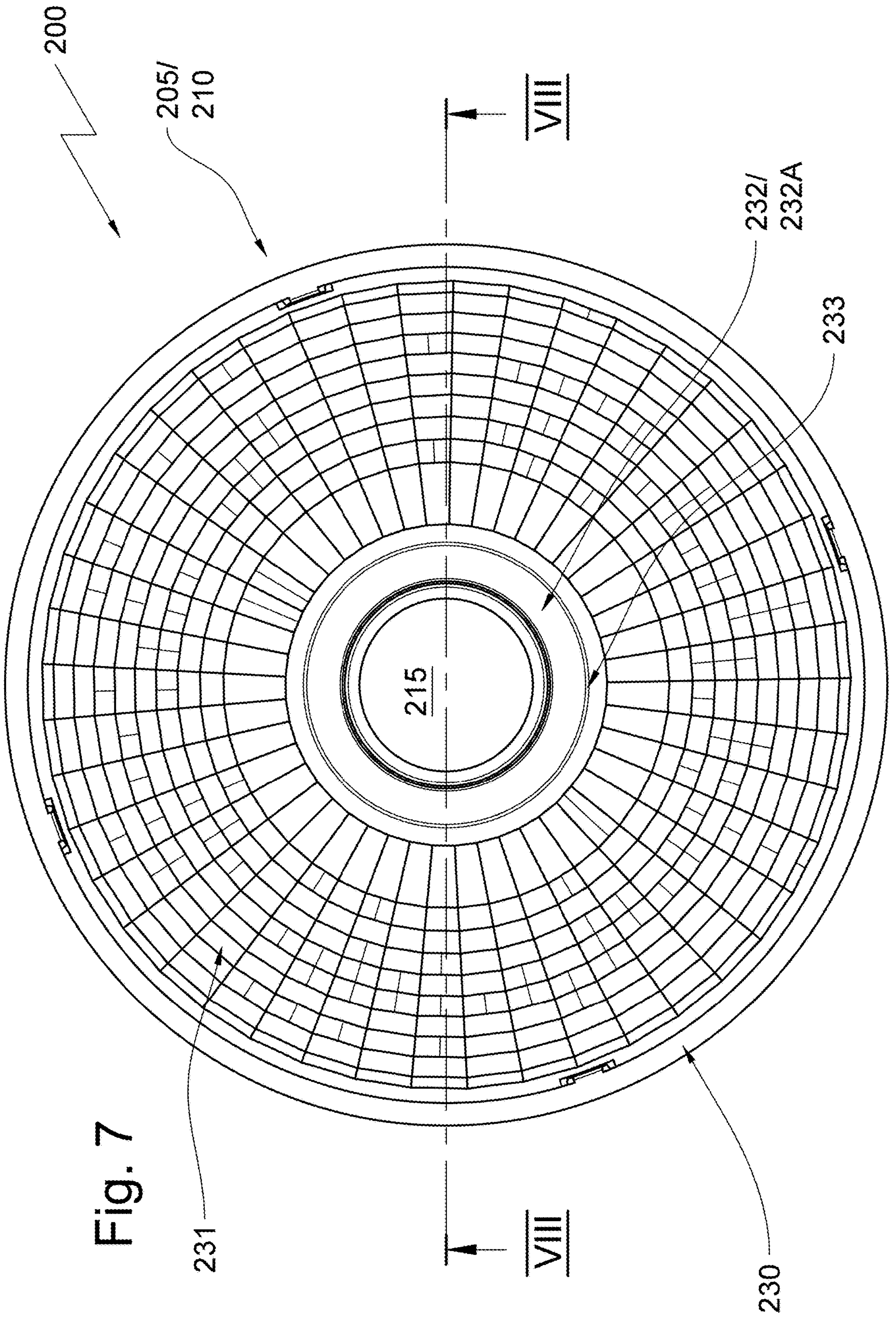
FIG. 7 is a top view of the second connection element with light directing component in the assembled state according to FIG. 6.

In the assembled state of the connection element 110 with reflector 111, it can clearly be seen in FIG. 4B that the stop means 135 of the inner ring 132A lie in the blind hole sections 129 of the outer ring 112 and arrange the reflector 111 on the outer ring 112.

The operating mechanism of the connection element 110 with the reflector 111 is now explained below.

Firstly, the outer ring 112 is fixedly screwed onto the heat sink not depicted by means of the screws 117 interacting with the receiving holes 126. The printed circuit board 114 with the LEDs 115 is then inserted loosely into the insertion contour 123. Within the outer ring 112, the printed circuit board 114 is now securely held against horizontal or arrangement surface-parallel shifting.

The reflector 111 is then fixed in the outer ring 112 with the base part 132 formed as the inner ring 132A.

For this purpose, the stop means 135 of the inner ring 132A are inserted into the stop means receivers 128 of the outer ring 112 and then moved into the blind hole sections 129 in the manner of a bayonet lock. This results in the fastening of the inner ring 132A with the reflector 111 on the outer ring 112. The bayonet locking is a particularly stable fastening method that can withstand mechanical loads in particular. The force exerted by the arranged stopping means 136 is transferred to the outer ring 112 and the printed circuit board 114, such that these are fastened due to the contact pressure of the inner ring 132A. The printed circuit board 114 can no longer fall out of the insertion contour 123.

Since the contact bridge (not depicted) is seated on the inner ring 132A of it, the printed circuit board 114 is contacted when the inner ring 132A is fully arranged and is thus functional.

It is particularly advantageous that the reflector 111 is now arranged particularly close to the printed circuit board 114 and the LEDs 115. This allows the light emitted by the LEDs 115 to radiate directly into the reflector base 130 and from there leave the reflector 111 in the light emission direction R.

It is thus ensured that the light efficiency is particularly high, since the light beams are not unnecessarily deflected by the outer ring 112, but rather shine directly into the reflector base body 130.

A second embodiment 200 of the connection element 210 and the reflector 211 is depicted in FIGS. 5 to 8B.

The connection element 210 has an outer ring 212. The outer ring 212 has an upper side S and a lower side T. Fastening elements 235 formed as domes 240 protrude from the underside of the outer ring 212. A receiving chamber 241 of the dome 240 allows the inner ring 232A to be inserted into the outer ring 212.

A catch spring 244 is respectively seated in the receiving chamber 241 of the dome 240. These initially comprise a spring limb 245, which is served by a latching leg 246 for anchoring in the outer ring 212, in particular inside its dome 240. In the concrete design, the latching leg 246 is directed radially outwards and towards the upper side of the connection element 210 pointing away from the counter bearing. However, this is not absolutely necessary for the function of the latching leg 246. In addition, in the exemplary embodiment, the latching leg 246 protrudes from the lower end of the spring limb 245 facing towards the heat sink.

At its end facing towards the upper side of the connection element 210, the spring limb 245 bears a latching contour overall provided with the reference numeral 247, which is directed radially inwards in the direction of the inner ring 232A. Starting from a latching contour apex 248, which also defines the maximum radial inner position of the latching contour 247, a retaining leg 249 drops at an angle in the direction of the heat sink and opens into the spring limb 245. Starting from the latching contour apex 248, an expanding leg 250 extends radially outwards in the direction of the upper side of the connection element 210 and also forms the free, upper end of the catch spring 244.

The inner ring 232A has two fastening elements 234 on the outer periphery, which are formed as a spring receiving chamber 242. The spring receiving chamber 242 respectively has a spring support leg 243. Each spring support leg 243 forms a latching lug 251, which points radially outwards with respect to the light emission direction R. Each latching lug 251 has a locking surface 252 pointing towards the upper side facing away from the counter bearing and an expanding surface 253 pointing in the direction of the counter bearing. Starting from a latching lug apex 254, which also outwardly defines the maximum radial extension of the latching lug 251, the locking surface 252 rises as an inclined surface in the direction of a vertical axis V. In contrast, the spreading surface 253 is formed as an inclined surface on the spring support leg 243 that slopes downwards in the direction of the vertical axis V.

Figure 8A:
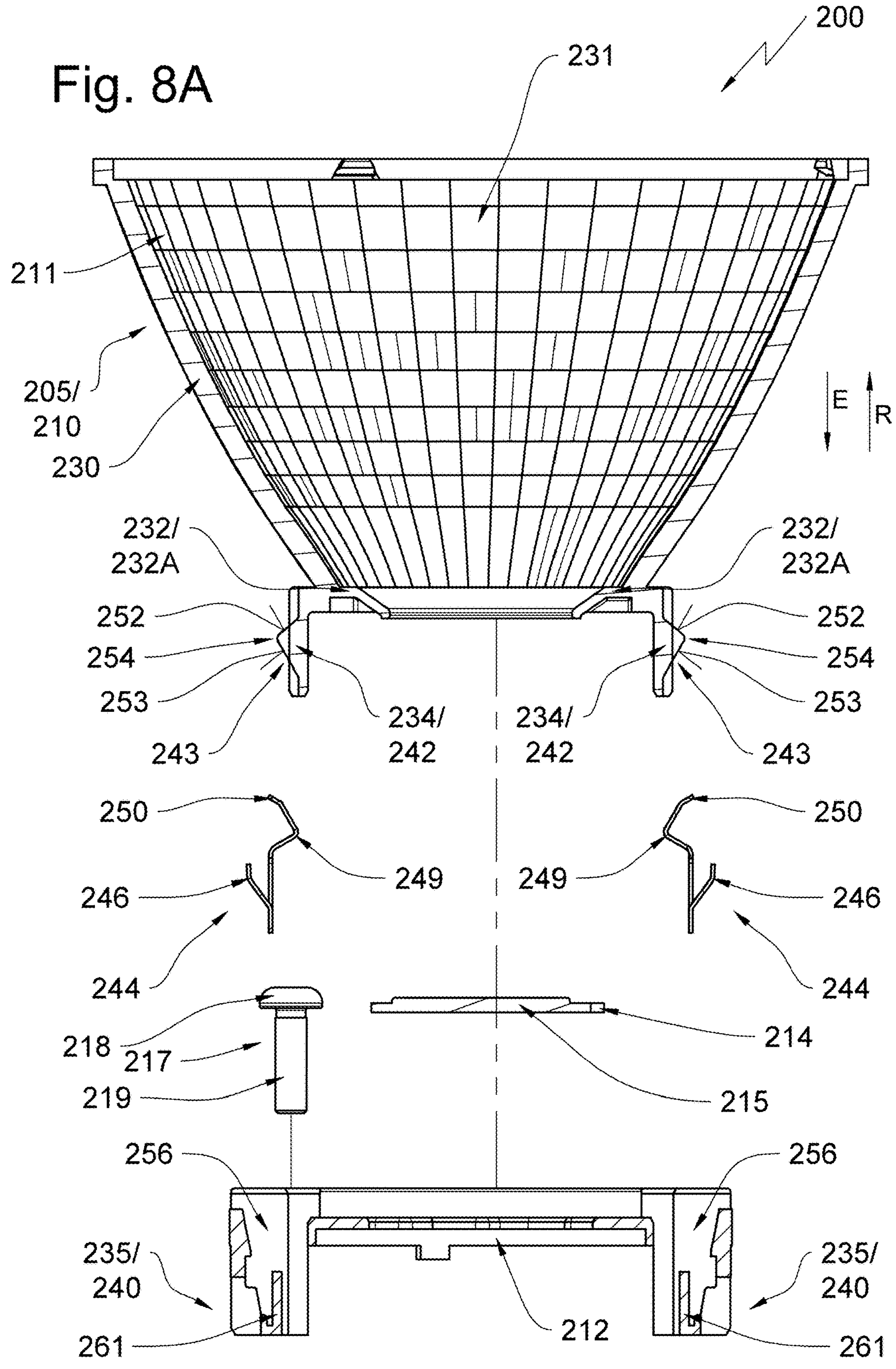
FIG. 8A shows an exploded view in a sectional depiction of the second connection element with light directing component in the assembled state according to intersecting lines VIIB-VIIB from FIG. 7.
Figure 8B:
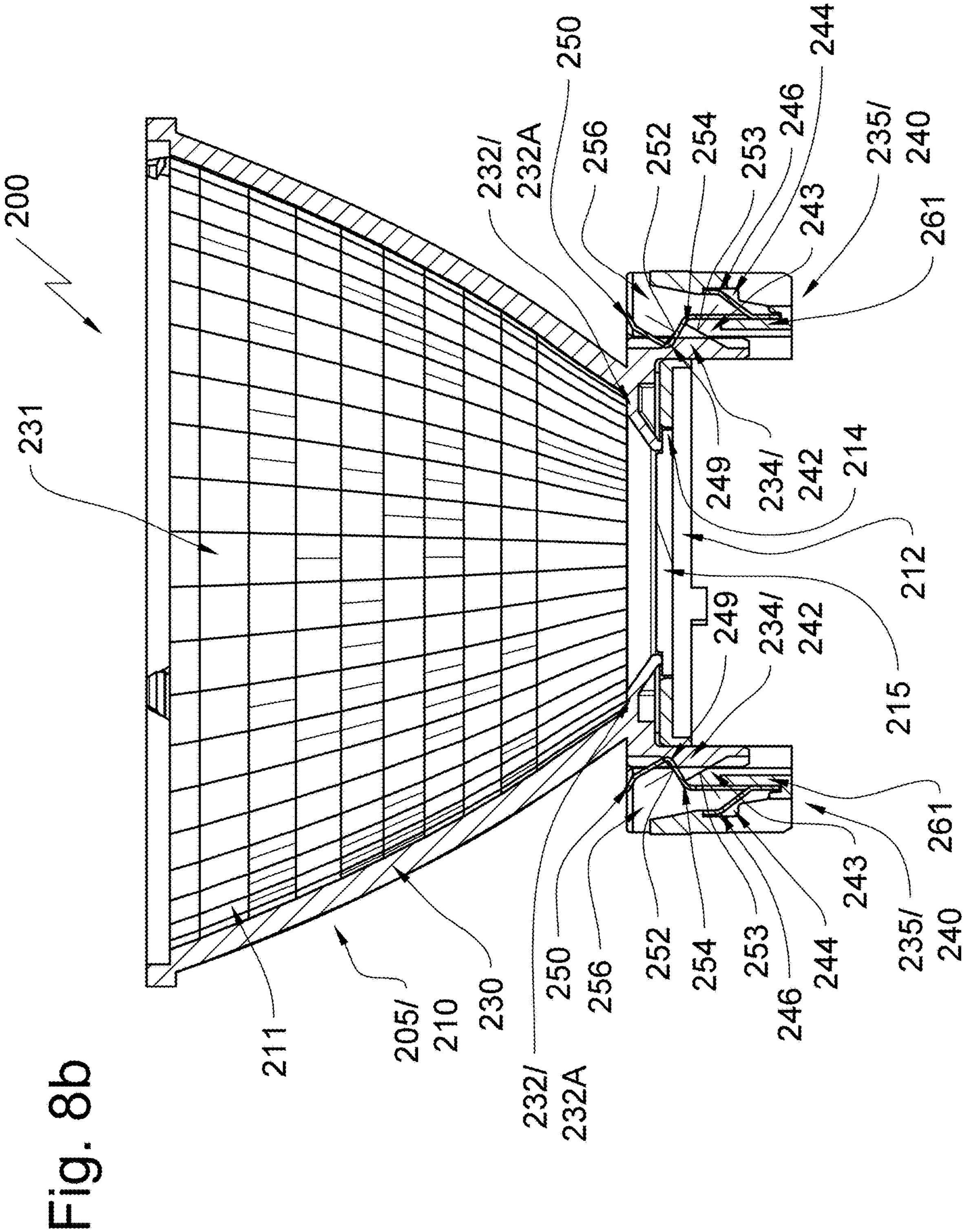
FIG. 8B is a sectional depiction of the second connection element with light directing component in the assembled state according to intersecting lines VIIB-VIIB from FIG. 7.

FIGS. 8A and 8B also allow a detailed view of the dome 240 of the outer ring 212.

Firstly, the dome 240 has an insertion opening 255 towards the upper side of the connection element 210, said insertion opening enabling access to a dome interior 256. The dome interior 256 can be divided into various functional regions as described below.

Firstly, the dome interior 256 provides a spring support leg receiver 257, in which the spring support leg 243 is inserted when the connection element 210 is assembled. The spring support leg receiver 257 is arranged radially inside the dome interior 256.

A latching leg receiver 258 is provided radially on the outside of the dome interior 256. Moreover, this forms a latching leg seat 259. The free end of the latching leg 246 is supported on this latching leg seat 259 for anchoring the catch spring 244 in the dome 240. The arrangement of the latching leg 259 in the latching leg receiver 258, including the anchoring of the latching leg 246 in the latching leg seat 258, can be seen in FIG. 8B.

A spring leg shaft 260 is formed in the dome 240 between the spring support leg receiver 257 and the latching leg receiver 258. The spring leg shaft 260 is delimited in relation to the spring support leg receiver 257 by a support wall 261, which prevents excessive displacement of the spring leg 245 radially inwardly in the direction of the spring support leg 243. In the direction of the latching leg receptacle 258, the spring leg shaft 260 is delimited by a guide pin 262, which holds the lower end of the spring leg 245 in a stable position in the spring leg shaft 260 and prevents the spring leg 245 from jumping over into the latching leg receiver 258.

The support wall 261 as well as the guide pin 262 are orientated in parallel to the vertical axis V, such that the functional spaces, namely the spring support leg receiver 257, the latching leg receiver 258 and the spring leg shaft 260 are vertically separated from one another and accessible via the insertion opening 255 of the dome 240.

Below, the assembled state of the outer ring 212 with the inner ring 232A is described with reference to FIG. 8.

Firstly, the latching springs 244 are pushed into the respectively corresponding dome 240 against the direction of light emission R, i.e. from the upper side of the connection element 210. Here, the spring limbs 245 enter the spring leg shaft 260. At the same time, the latching leg 246 is held in the latching leg seat 259 of the latching leg receiver 258. In this way, the latching spring 244 latches in the dome 240.

The latching contour 247 of the latching spring 244 extends radially inwards in the direction of the vertical axis V into the spring support leg receiver 257.

The outer ring 212 is now placed on the heat sink, wherein the domes 240 are pushed into the cavities of the heat sink, which are not depicted. In this way, the underside of the outer ring 212 facing towards the heat sink comes to rest on the arrangement surface of the heat sink.

To finish assembling the connection element 210, the printed circuit board 214, i.e. the LED light module 215, is now inserted into the insertion contour 223 formed by the outer ring 212, such that the underside of the printed circuit board 214 also abuts on the arrangement surface of the heat sink. Thermal conductive means (not depicted) are optionally still present between the printed circuit board 214 and the heat sink.

Inside the outer ring 212, the printed circuit board 214 is now securely held against horizontal or arrangement surface-parallel shifting.

The inner ring 232A with the reflector 211 is now placed on the outer ring 212 against the direction of light emission R. Here, the spring support legs 243 are inserted into the respectively allocated dome 240 and there into the corresponding spring support leg receiver 260. In doing so, the expansion surfaces 253 of the respective latching lug 251 come into contact with the respectively allocated expansion leg 250 of the catch spring 244, wherein the resulting pairing of inclined surfaces 253/250 leads to a radial outward displacement of the latching contour 247. This movement reaches its maximum when the latching contour apex 248 is positioned on the latching nose apex 254.

Subsequently, with continued insertion movement against the light emission direction R, the retaining legs 249 engage with the respective locking surface 252 of the latching lug 251. Here, the latching contour 247 is shifted radially inwards in a spring-back resilient manner, wherein the pairing of inclined surfaces between the retaining leg 249 and the locking surface 252 apply a force component directed in the direction of the arrangement surface to the inner ring 232A. In doing so, the inner ring 232A with the reflector 211 is braced against the inserted printed circuit board 214 and ensures sufficient contact pressure of the printed circuit board 214 on the heat sink in order to promote optimum heat dissipation. In the same way, the aforementioned force component, which braces the inner ring 232A in the direction of the arrangement surface, also promotes correct contact of the contact arrangement with the contact fields of the printed circuit board 214 in order to achieve correct electrical transition values (not depicted).

Due to the domes 240 extending into a region below the arrangement surface, a sufficiently large space is created in order to create an elongated spring element in the form of the catch spring 244 in the direction of light emission R or in parallel to the vertical axis V, which provides sufficiently large spring travel for holding the inner ring 232A in the outer ring 212 via its longitudinal extension of the spring limb 245 within the spring leg shaft 256.

It is also particularly advantageous with this assembling that the reflector 211 is now arranged directly with the inner ring 232 A on the printed circuit board 214 and the LEDs 215. As a result, the light emitted by the LEDs 215 can shine directly into the reflector base body 230 and from there leave the reflector 111 in the light emission direction R. The light beams are not deflected by the outer ring 232, as is otherwise the case in the prior art. This ensures a particularly high degree of light efficiency.

As an alternative to the reflectors 111 and 211, the light directing component 305, 605 can also be formed as a collimator 370, 670 or collimator lens, as shown in FIGS. 9 and 11. Furthermore, the light directing component 405, 705 can also be formed as a holding frame 430, 730 for a collimator 473, 773. Here, the respective contact bridges (not depicted) are seated in the holding frame 430, 730.

In FIGS. 9 and 11, the inner ring 332A, 632A is formed as the base part 332, 632 of the collimator 370, 670. The arrangement and operating principle of the collimator 370 on the outer ring 312 is identical to the arrangement of the reflector 111 according to the first embodiment 100. The collimator 370 has a light-emitting collimator body 371.

The arrangement and the operating principle of the collimator 670 on the outer ring 612 is identical to the arrangement of the reflector 211 according to the second embodiment 200. The collimator 670 also forms a light-emitting collimator body 671.

FIGS. 10 and 12 show the light directing component 405, 705 formed as a holding frame 430, 730 for a collimator 473, 773. Here, the respective inner ring 432A, 732A is formed as a base part 432, 732 of the holding frame 430, 730, which interact with the respective collimator 473, 773. For this purpose, the holding frames 430, 730 respectively form latching arms 480, 780, which interact with latching receivers 472, 772, which are formed by the collimators 473 and 773. During assembly with the holding frame 430, 730, the latching arms 480, 780 engage in the latching receivers 472, 772 of the collimator 473, 773.

The arrangement and the operating principle of the holding frame 430 with collimator 473 on the outer ring 412 is identical to the arrangement of the reflector 111 according to the first embodiment 100.

Similarly, the arrangement and the operating principle of the holding frame 730 with collimator 773 on the outer ring 712 is identical to the arrangement of the reflector 211 according to the second embodiment 200.

Further other light directing components are also conceivable, which can be formed as other types of optics.

In the above description, it is depicted that the light directing component and the inner ring are combined to form a single component. The inner ring, which is formed as part of the light directing component, is held in the outer ring by fastening means. A bayonet-like fixing by means of a plug-in rotary movement and a purely vertical insertion and latching of the inner ring in the outer ring has been presented. In DE 10 2024 104 511.6, further concrete embodiments for fastening the inner ring to the outer ring for a similar LED connection element are depicted and explained. The fastening methods provided there for an inner ring without a light directing component can also be applied to the present inner ring as part of the light directing component. Reference is therefore made to the content of DE 10 2024 104 511.6, which, with its full wording, is part of this application.

LIST OF REFERENCE NUMBERS

100 first embodiment
105 light directing component
110 first connection element
111 reflector
112 outer ring
114 printed circuit board
115 LED
117 screw
118 screw head

119 screw body
120 bottom base plate
121 aperture
122 inner silhouette
123 insertion contour
124 engagement contours
125 annular collar
126 receiving holes
128 stop means receiver
129 blind hole sections
130 reflector base body
131 reflector chamber
132 base part
132A inner ring
133 opening
134 fastening elements of the inner ring
135 fastening elements of the outer ring 112
136 stop means
200 second embodiment
205 light directing component
210 connection element
211 reflector
212 outer ring
214 printed circuit board
215 LED
217 screw
218 screw head
219 screw body
220 bottom base plate
221 aperture
222 inner silhouette
223 insertion contour
224 engagement contours
225 annular collar
226 receiving holes
230 reflector base body
231 reflector chamber
232 base part
232A inner ring
233 opening
234 fastening elements of the inner ring
235 fastening elements of the outer ring
240 dome
241 receiving chamber
242 spring receiving chamber
243 spring support leg
244 catch spring
245 spring limb
246 latching leg
247 latching contour
248 latching contour apex
249 holding leg
250 expanding leg
251 latching lug
252 locking surface
253 spreading surface
254 latching lug apex
255 insertion opening
256 dome inner chamber
257 spring support leg receiver
258 latching leg receiver
259 latching leg seat
260 spring limb shaft
261 support wall
262 guiding pin
300 third embodiment
305 light directing component
310 third connection element
312 outer ring
314 printed circuit board
315 LED
317 screw
318 screw head
319 screw body
320 bottom base plate
321 aperture
322 inner silhouette
323 insertion contour
324 engagement contours
325 annular collar
326 receiving holes
328 stop means recess
329 blind hole sections
330 component body
331 component chamber
332 base part
332A inner ring
333 opening
334 fastening elements of the inner ring
335 fastening elements of the outer ring 312
336 stop means
370 collimator of the third embodiment
371 collimator body
372 latching receiver
400 fourth embodiment
405 light directing component
410 fourth connection element
412 outer ring
414 printed circuit board
415 LED
417 screw
418 screw head
419 screw body
420 bottom base plate
421 aperture
422 inner silhouette
423 insertion contour
424 engagement contours
425 annular collar
426 receiving holes
428 stop means recess
429 blind hole sections
430 holding frame
431 component chamber
432 base part
432A inner ring
433 opening
434 fastening elements of the inner ring
435 fastening elements of the outer ring 412
436 stop means
471 collimator body
472 latching receiver
473 collimator of the fourth embodiment
480 latching arm
500 counter bearing/heat sink
510 arrangement surface of 500
511 surface of 500
600 fifth embodiment
605 light directing component
610 fifth connection element
612 outer ring
614 printed circuit board
615 LED
617 screw

618 screw head
619 screw body
620 bottom base plate
621 aperture
622 inner silhouette
623 insertion contour
624 engagement contours
625 annular collar
626 receiving holes
630 component body
631 component chamber
632 base part
632A inner ring
633 opening
634 fastening elements of the inner ring
635 fastening elements of the outer ring
640 dome
641 receiving chamber
642 spring receiving chamber
643 spring support leg
644 catch spring
645 spring limb
646 latching leg
647 latching contour
648 latching contour apex
649 holding leg
650 expanding leg
651 latching lug
652 locking surface
653 spreading surface
654 latching lug apex
655 insertion opening
656 dome inner chamber
657 spring support leg receiver
658 latching leg receiver
659 latching leg seat
660 spring limb shaft
661 support wall
662 guiding pin
670 collimator of the fifth embodiment
671 collimator body
672 latching receiver
700 sixth embodiment
705 light directing component
710 sixth connection element
712 outer ring
714 printed circuit board
715 LED
717 screw
718 screw head
719 screw body
720 bottom base plate
721 aperture
722 inner silhouette
723 insertion contour
724 engagement contours
725 annular collar
726 receiving holes
730 holding frame
731 component chamber
732 base part
732A inner ring
733 opening
734 fastening elements of the inner ring
735 fastening elements of the outer ring
740 dome
741 receiving chamber
742 spring receiving chamber
743 spring support leg
744 catch spring
745 spring limb
746 latching leg
747 latching contour
748 latching contour apex
749 holding leg
750 expanding leg
751 latching lug
752 locking surface
753 spreading surface
754 latching lug apex
755 insertion opening
756 dome inner chamber
757 spring support leg receiver
758 latching leg receiver
759 latching leg seat
760 spring limb shaft
761 support wall
762 guiding pin
771 collimator body
772 latching receiver
773 collimator of the sixth embodiment
780 latching arm
E installation direction
K contact spring
M centre point
R direction of light emission
S upper side of the outer ring
T lower side of the outer ring
V vertical axis
U under side of the inner ring
X system axis

What is claimed is:

1. A connection element (110, 210, 310, 410, 610, 710) for electrically connecting an LED light module (115, 215, 315, 415, 615, 715), the LED light module (115, 215, 315, 415, 615, 715) having a printed circuit board (114, 214, 314, 414, 614, 714) provided with contact springs (K) for an electrical supply of an LED, the connection element (110, 210, 310, 410, 610, 710) comprising:

an annular frame, the annular frame being configured to cover the printed circuit board (114, 214, 314, 414, 614, 714) and to hold the printed circuit board (114, 214, 314, 414, 614, 714) mechanically on an arrangement surface (510) of a counter bearing (500); and a contact arrangement, the contact arrangement being mounted in the annular frame and configured to supply the LED light module (115, 215, 315, 415, 615, 715) with electricity, wherein the annular frame is divided into an outer ring (112, 212, 312, 412, 612, 712) and an inner ring (132A, 232A, 323A, 432A, 632A, 732A), wherein the outer ring (112, 212, 312, 412, 612, 712) is configured to surround the printed circuit board (114, 214, 314, 414, 614, 714) and to hold the printed circuit board (114, 214, 314, 414, 614, 714) in a parallel direction to the arrangement surface (510) of the counter bearing (500), wherein the inner ring (132A, 232A, 323A, 432A, 632A, 732A) at least regionally surrounds the printed circuit board (114, 214, 314, 414, 614, 714) and is configured to hold the printed circuit board (114, 214, 314, 414, 614, 714) in a vertical direction to a surface (511) of the counter bearing (500), and wherein the inner ring (132A, 232A, 323A, 432A, 632A, 732A) is implemented in a light directing component (105, 205, 305, 405, 605, 705).

2. The connection element (110, 210, 310, 410, 610, 710) according to claim 1, wherein the inner ring (132A, 232A, 323A, 432A, 632A, 732A) forms a base part (132, 232, 323, 432, 632, 732) of the light directing component (105, 205, 305, 405, 605, 705), wherein the inner ring (132A, 232A, 323A, 432A, 632A, 732A) is arranged downstream of the outer ring (112, 212, 312, 412, 612, 712) in a direction of light emission (R).

3. The connection element (110, 210, 310, 410, 610, 710) according to claim 1, wherein the inner ring (132A, 232A, 323A, 432A, 632A, 732A) forms an inner fastening element (134, 234, 334, 434, 634, 734) which interacts for fastening with an outer fastening element (135, 235, 335, 435, 635, 735) of the outer ring (112, 212, 312, 412, 612, 712).

4. The connection element (110, 310, 410) according to claim 1, wherein the inner ring (132A, 323A, 432A) forms a stop (136, 336, 436) as an inner fastening element (134, 334, 434), and wherein the outer ring (112, 312, 412) forms a stop receiver (128, 328, 428) as an outer fastening element (135, 335, 435).

5. The connection element (110, 310, 410) according to claim 4, wherein, to arrange the inner ring (132A, 332A, 432A) in the outer ring (112, 312, 412), the stop (136, 336, 436) is inserted into the stop receiver (128, 328, 428), and the inner ring (132A, 332A, 432A) and the outer ring (112, 312, 412) are fastened to each other by turning the inner ring (132A, 332A, 432A) in a bayonet-style locking motion.

6. The connection element (110, 310, 410) according to claim 1, wherein an inner fastening element (134, 334, 434) of the inner ring (132A, 332A, 432A) and an outer fastening element (135, 335, 435) of the outer ring (112, 312, 412) are screwing means.

7. The connection element (110, 310, 410) according to claim 6, wherein the inner ring (132A, 332A, 432A) has an outer contour which is formed as an outer thread, and the outer ring (112, 312, 412) has an inner contour which is formed as an inner thread, and wherein the outer thread of the inner ring (132A, 332A, 432A) interacts with the inner thread of the outer ring (112, 312, 412) for fastening in the outer ring.

8. The connection element (110, 310, 410) according to claim 6, wherein the inner ring (132A, 332A) has an inner contour which is formed as an inner thread, and the outer ring (112, 312, 412) has an outer contour which is formed as an outer thread, and wherein the outer thread of the inner ring for fastening in the outer ring (112, 312, 412) interacts with the inner thread of the outer ring (112, 312, 412).

9. The connection element (210, 610, 710) according to claim 1, wherein an inner fastening element (234) of the inner ring (232A, 632A, 732A) and an outer fastening element (235, 635, 735) of the outer ring (212, 612, 712) are latching means (244, 644, 744).

10. The connection element (210, 610, 710) according to claim 9, wherein the inner fastening element (234, 634, 734) of the inner ring (232A, 632A, 732A) forms a spring-receiving chamber (242, 642, 742) for catch springs (244, 644, 744), which extends in relation to the outer ring (212, 612, 712) abutting on the arrangement surface (510) into a region below the arrangement surface (510), wherein the outer ring (212, 612, 712) forms a dome (240, 640, 740) as a fastening element (235, 635, 735) for receiving the catch springs (244, 644, 744), and wherein the dome (240, 640, 740) protrudes from an underside of the outer ring (212, 612, 712).

11. A light directing component (105, 205, 305, 405, 605, 705) for a luminaire, comprising:

a component base body (130, 230, 330, 430, 630, 730) which spans a component chamber (131, 231, 321, 421, 621, 721), wherein the component base body (130, 230, 330, 430, 630, 730) has a base part (132, 232, 332, 432, 632, 732) which forms an opening (133, 233, 333, 433, 633, 733) for receiving a light module (115, 215, 315, 415, 615, 715), and wherein the base part (132, 232, 332, 432, 632, 732) of the light directing component (105, 205, 305, 405, 605, 705) is formed as an inner ring (132A, 232A) of the connection element (111, 211, 311, 411, 611, 711) according to claim 1.

12. The connection element (110, 210, 310, 410, 610, 710) according to claim 1, wherein the wherein the outer ring (112, 212, 312, 412, 612, 712) is configured solely to laterally surround and guide the printed circuit board (114, 214, 314, 414, 614, 714) to prevent displacement in a direction parallel to the arrangement surface (510), and wherein only the inner ring (132A, 232A, 323A, 432A, 632A, 732A) is configured to exert a holding or contact pressure on the printed circuit board (114, 214, 314, 414, 614, 714) in a vertical direction toward the surface (511) of the counter bearing (500).

13. The connection element (110, 210, 310, 410, 610, 710) according to claim 1, wherein the printed circuit board (114, 214, 314, 414, 614, 714) has a generally rectangular outer contour corresponding to an insertion contour (123, 223, 323, 423, 623, 723) formed by the outer ring (112, 212, 312, 412, 612, 712).

14. The connection element (110, 210, 310, 410, 610, 710) according to claim 1, wherein the printed circuit board (114, 214, 314, 414, 614, 714) carries the contact springs (K) at corner regions of the printed circuit board, and wherein the contact springs (K) are oriented toward the inner ring (132A, 232A, 323A, 432A, 632A, 732A) for electrical contact with the contact arrangement mounted on the inner ring.

* * * * *